US006789463B2

(12) United States Patent
Lile

(10) Patent No.: US 6,789,463 B2
(45) Date of Patent: Sep. 14, 2004

(54) METHODS AND SYSTEMS FOR ALERTING A USER TO CLEAN APPLIANCE

(75) Inventor: Lawrence Lile, Columbia, MO (US)

(73) Assignee: Salton, Inc., Lake Forest, IL (US)

( * ) Notice: Subject to any disclaimer, the term of this patent is extended or adjusted under 35 U.S.C. 154(b) by 35 days.

(21) Appl. No.: 10/126,871

(22) Filed: Apr. 19, 2002

(65) Prior Publication Data

US 2003/0196556 A1 Oct. 23, 2003

(51) Int. Cl.[7] .............................................. A47J 37/08
(52) U.S. Cl. ............................ 99/343; 99/344; 99/385; 99/389
(58) Field of Search .......................... 99/342, 343, 344, 99/385, 389, 391, 329 R, 329 RT

(56) References Cited

U.S. PATENT DOCUMENTS

| 4,044,660 A | * | 8/1977 | Montague et al. ......... 99/343 X |
| 5,672,288 A | * | 9/1997 | Tran ..................... 99/329 R X |
| 5,692,432 A | * | 12/1997 | Hazan et al. ......... 99/329 R X |
| 6,140,621 A | * | 10/2000 | Ho et al. ............. 99/329 R X |

* cited by examiner

Primary Examiner—Reginald L. Alexander
(74) Attorney, Agent, or Firm—Sonnenschein Nath & Rosenthal LLP

(57) ABSTRACT

The present invention relates to an indicator on a household appliance to alert a user to clean the appliance. For example, the indicator alerts the user when to clean a crumb tray in a toaster.

23 Claims, 9 Drawing Sheets

METHODS AND SYSTEMS FOR ALERTING A USER TO CLEAN APPLIANCE

FIELD OF THE INVENTION

The present invention relates generally to methods and systems for alerting a user to clean an appliance.

BACKGROUND OF THE INVENTION

Conventional heating devices operate at one power level during a given heating cycle. To improve heating time, one solution has been to increase the power of the heating device. For example, to improve the heating time in a toaster, attempts have been made to increase the power in a standard two-slice toaster from approximately 850 watts to approximately 1400 watts. To obtain consistent toast color, if the power is increased, the toasting time is decreased. In particular, toast color has been found to be related to the power multiplied by the toasting time. For example, in an 850-watt toaster, a given slice of bread may be toasted to a medium color in approximately 120 seconds. Thus, a medium color would require 102,000 watt-seconds. If the power were raised to 1400 watts, the same slice of bread would require only 73 seconds to obtain a medium color.

Although high-powered heating devices heat food more quickly, as the heating power is increased, the food has less time to cook properly. Thus, the food tends to sear on the surface, while the inside remains cool and uncooked. This blackened food item is not only unappealing in appearance, but the taste also is affected. Thus, these high-powered heating devices have been found to be unacceptable, and there is a need to increase heating speed without sacrificing appearance and taste.

Conventional heating devices also run the risk of setting fires due to short circuits. With increased power, conventional heating devices have an increased capacity to ignite food, and the fires set by these heating devices spread much more quickly than the fires set by lower powered heating devices. Thus, there is an increased need for additional safety features in heating devices when higher power is used.

Crumbs that accumulate in the crumb tray of a toaster also are at risk of burning. Thus, crumb trays need to be cleaned periodically. Unless the user is accustomed to cleaning the crumb tray on a regular basis, a typical user will not clean the tray until the burning crumbs remind the user that the tray needs to be cleaned.

SUMMARY OF THE INVENTION

In accordance with the present invention, a toaster is provided comprising means for activating the toaster and a counter. The counter is coupled to the activating means and is incremented upon activation of the activating means.

In accordance with the present invention, a toaster is provided comprising means for activating the toaster, a counter, a memory, and an indicator. The counter is coupled to the activating means and is incremented upon activation of the activating means. The memory stores a value of the counter. The indicator is coupled to the counter, and produces a signal when the counter reaches a set value.

In accordance with the present invention, a method is provided comprising the steps of counting a number of times a household appliance is activated, determining when the number reaches a set value, and when it is determined that the number reaches the set value, providing an indication that the number reached the set value.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to implementations consistent with the present invention as illustrated in the accompanying drawings. Wherever possible, the same reference numbers will be used throughout the drawings and the following description to refer to the same or like parts.

Although described for use in a toaster, one skilled in the art will appreciate that the present invention can be used in any type of heating device, such as a rice cooker, an oven, etc.

Figure 1:
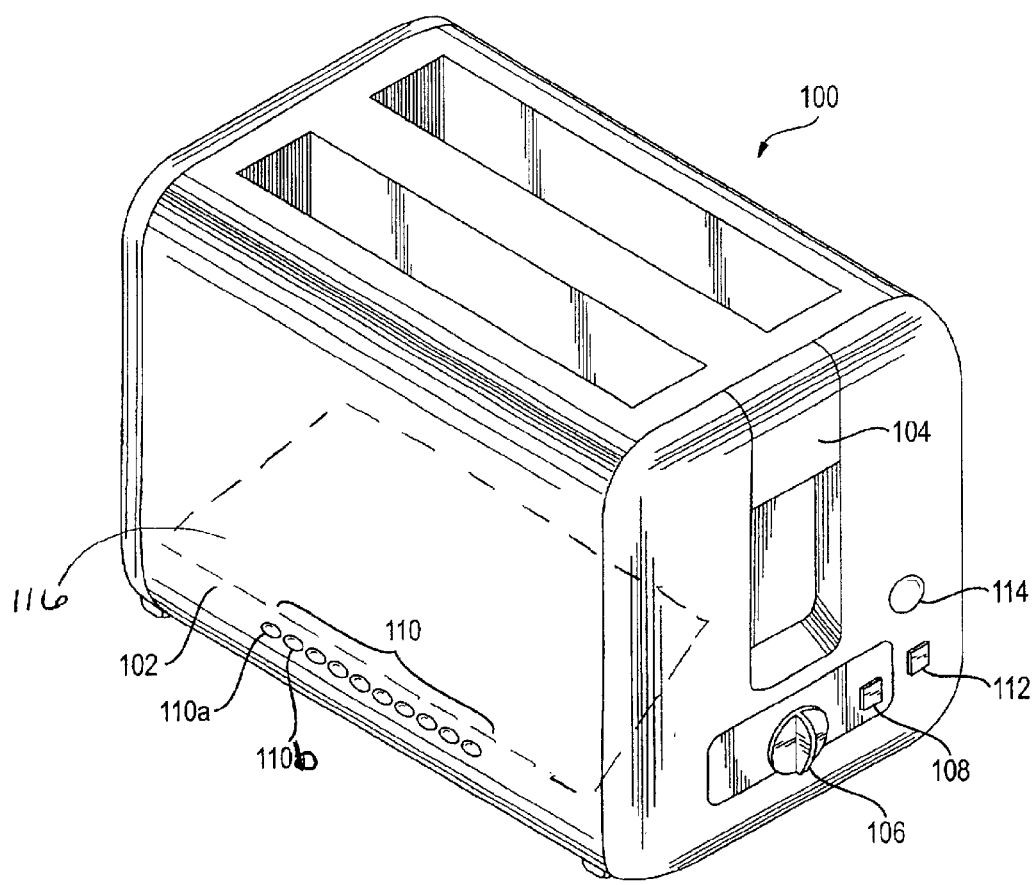
FIG. 1 depicts a high-speed toaster in accordance with the present invention.

FIG. 1 depicts one embodiment of a high-speed heating device, illustrated as a toaster 100. Toaster 100 has a housing 102 and includes a heat activation lever 104, a darkness control knob 106, a fast toast button 108, a progression indicator 110, a crumb tray button 112, a crumb tray indicator 114, and a crumb tray 116. Heat activation lever 104 is used to activate toaster 100. Darkness control knob 106 can be adjusted to control the color of the toast. Fast toast button 108 may be activated to set toaster 100 in a high-speed mode. In one embodiment, if fast toast button 108 is activated, toaster 100 is in the high-speed mode for a given percentage (e.g., 67%) of the toasting cycle and shifts to the low-speed mode for the remainder (e.g., 33%) of the toasting cycle. Alternatively, a speed control knob (not shown) or other similar control may be included to alter the percentage of the toasting cycle during which the toaster is in the high-powered mode versus the low-powered mode. In the example shown, if fast toast button 108 is not activated, toaster 100 will not operate in the high-powered mode.

Rather, toaster 100 operates as a conventional toaster, toasting bread at a single low power throughout the toasting cycle.

Progression indicator 110 indicates the status of the toasting cycle. For example, progression indicator 110 is depicted as a row of ten LEDs, each LED representing 10% of the toasting cycle. As a slice of toast progresses through the toasting cycle, the respective LED is activated. Thus, after the bread has progressed through 10% of the toasting cycle, the first LED 110a is activated. The second LED 110b is activated after the bread has progressed through 20% of the toasting cycle. The cycle continues until all of the LEDs are activated at the completion of the toasting cycle. Although depicted as a row of LEDs, one skilled in the art will recognize that any indication of the status of the toasting cycle may be used, for example a timer, a dial, etc. In addition, the color of the LED may change to differentiate between high power and low power. For example, the LED may be red when the toaster is operating in the high-powered mode and green when the toaster is operating in the low-powered mode. Thus, if the toaster is in the high-powered mode during 3/5 of the toasting cycle, the first six LEDs will be red while the remaining four LEDs will be green. Alternatively, if the toaster is in the high-powered mode during 4/5 of the toasting cycle, the first eight LEDs will be red while the remaining two LEDs will be green.

Toaster 100 includes a counter to count the number of times toaster 100 is used before crumb tray 116 on toaster 100 should be cleaned. When the counter reaches a set value (e.g., 20) the crumb tray indicator 114 is activated to alert the user to clean crumb tray 116. Although depicted as a visual indication, crumb tray indicator 114 also may assume other forms, e.g., audible signals such as a bell or other sounds may be used to alert the user to clean crumb tray 116. In addition, one of ordinary skill in the art will recognize that the manufacturer and/or user of toaster 100 may adjust the set value. Crumb tray button 112 resets the counter for crumb tray 116. Crumb tray button 112 may also cause crumb tray 116 to open automatically, thus ensuring that crumb tray 116 has been cleaned when crumb tray button 112 is activated. Alternatively, the counter may be reset when toaster 100 detects that crumb tray 116 has been opened.

Figure 2:
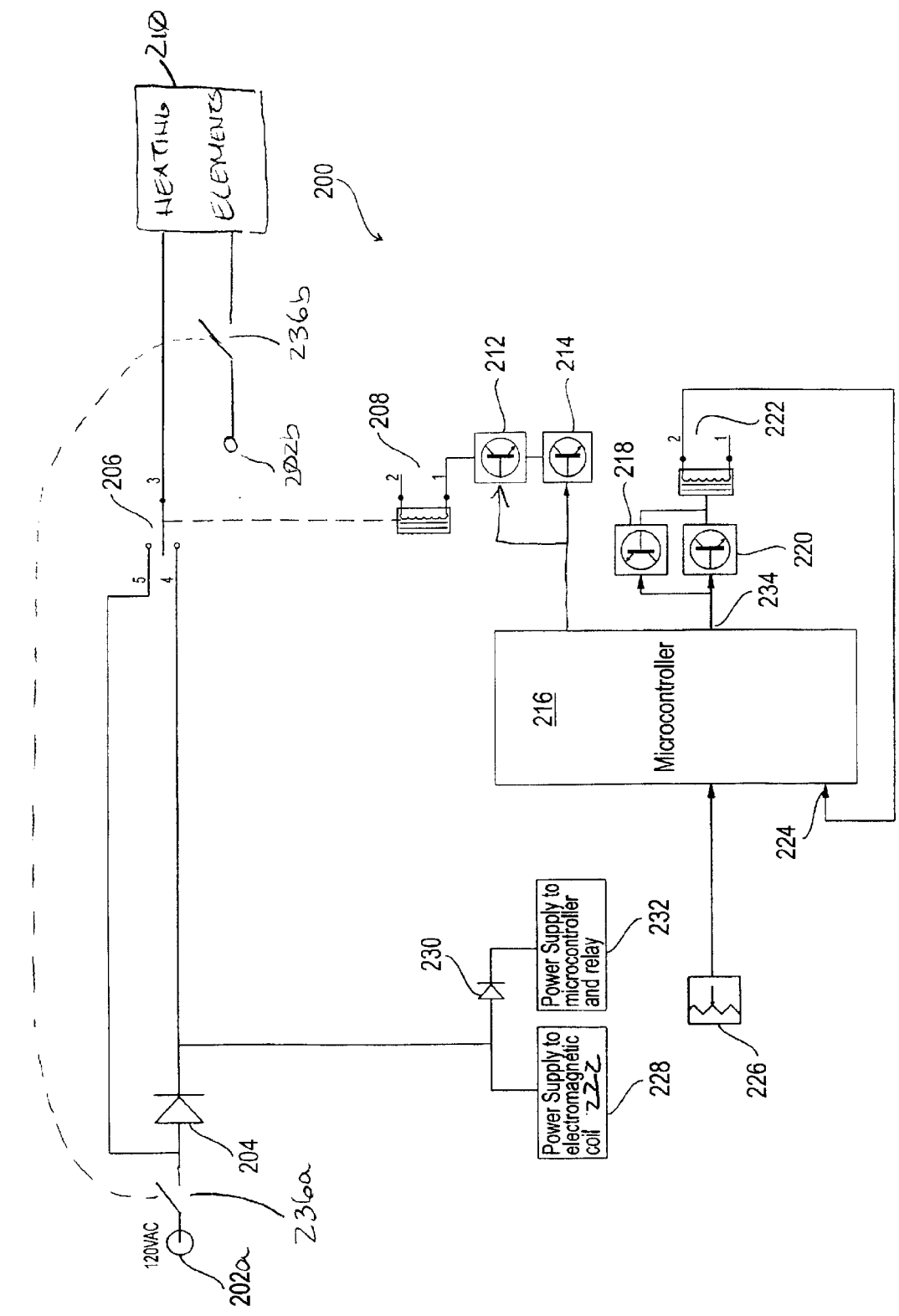
FIG. 2 depicts one embodiment of a circuit used in the high-speed toaster depicted in FIG. 1.
Figure 3:
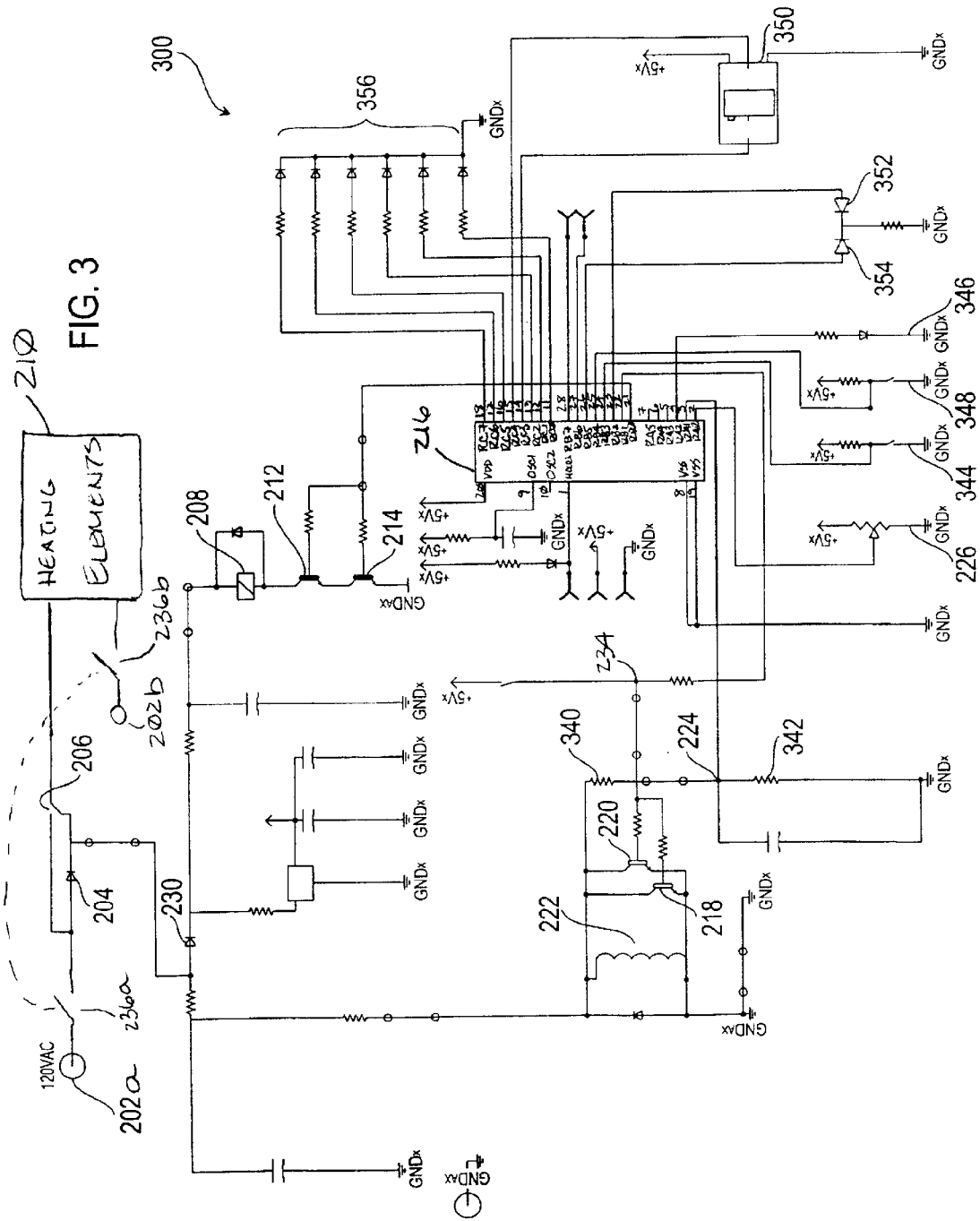
FIG. 3 depicts a second embodiment of a circuit used in the high-speed toaster depicted in FIG. 1.

FIG. 2 depicts one embodiment of a circuit 200 for high-speed toaster 100 in accordance with methods and systems consistent with the present invention, and FIG. 3 depicts the circuit 100 for the high-speed toaster of FIG. 2 in more detail. In FIGS. 2 and 3, like reference numerals designate corresponding parts.

Circuit 200 includes a power diode 204 that rectifies the current from the power source 202 to the heating elements 210 of toaster 100. Diode 216 may be one of the FES8JT, FESF8JT, or FESB8JT Series rectifiers manufactured by General Semiconductor. Rectifying the current reduces the power to heating elements 210 by half. Relay 206, 208 toggles between full and half power by selecting unrectified or rectified current, respectively. U.S. Pat. No. 5,644,974 discloses the use of a diode to reduce power to a toaster heating element, and is incorporated herein by reference. One skilled in the art will recognize that other techniques may be used to reduce the power to the toaster heating element, for example, a switch may be included between high and low resistance heating elements. Alternatively, as one skilled in the art will recognize, a thyristor (not shown) or triac (not shown) could be used to adjust the power level of the heating element. Another embodiment may also include a switch between multiple heating elements to adjust the power level.

In addition to rectifying current to heating elements 210, diode 204 also provides DC current to power supply 228 for DC operated latching electromagnetic coil 222. If diode 204 fails in an open condition, latching electromagnetic coil 222 will not receive DC power. As a result, toaster 100 will not latch and will fail safe. If diode 204 fails shorted, DC electromagnetic coil 222 receives AC current, which will prevent it from latching. Without latching coil 222, if diode 204 were to short, toaster 100 would continue operating in the high-powered mode during the low-powered portion of the cycle, which could result in overheating. Arranging circuit 200 so that a shorted diode 204 prevents toaster 100 from latching assures that this condition cannot occur. Although depicted with a toaster 100, one with ordinary skill in the art will recognize that this type of safety device can be used with any appliance, regardless of whether the appliance has multiple power levels.

Figure 9:
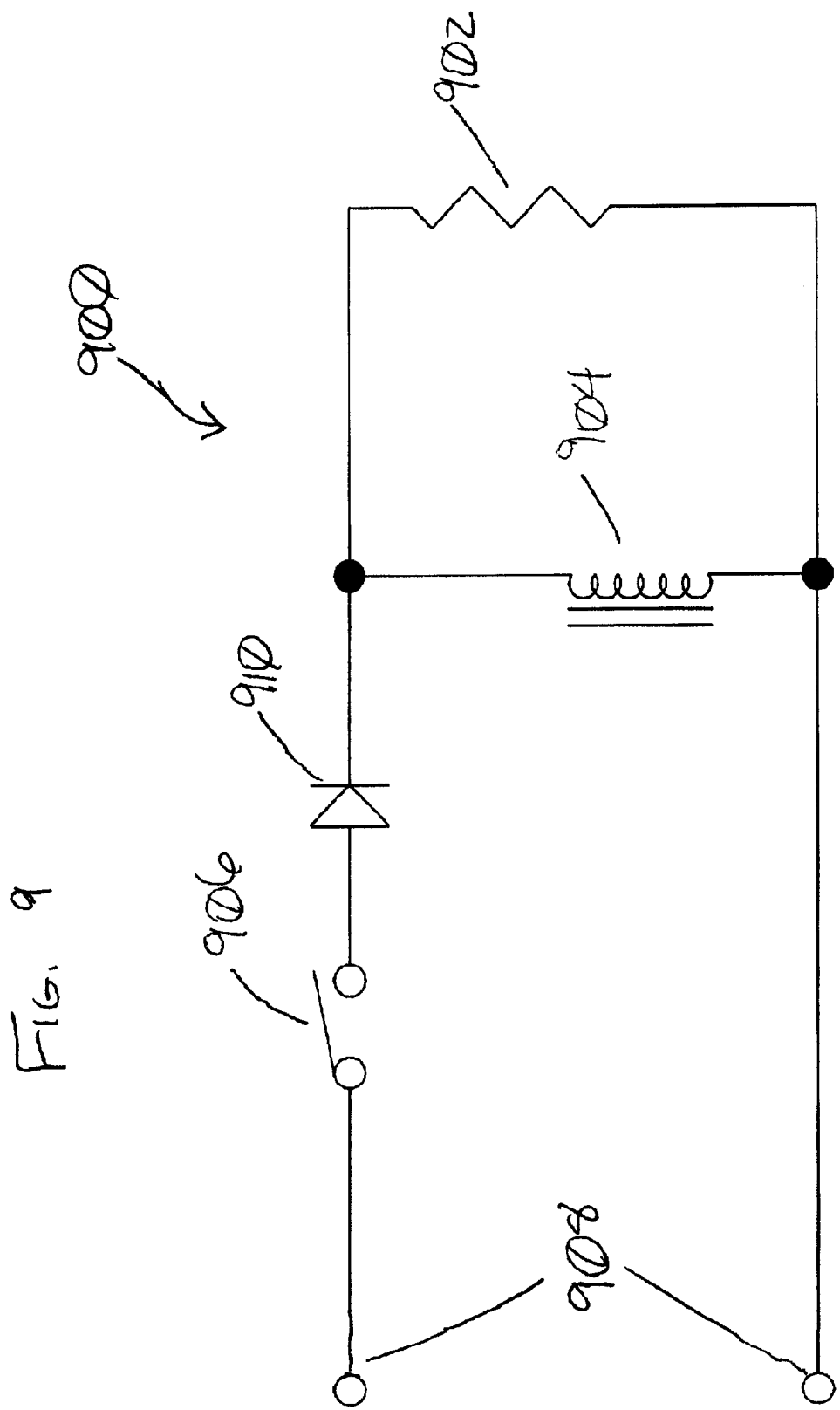
FIG. 9 depicts a circuit to protect a load, in accordance with the present invention.

For example, FIG. 9 depicts a circuit 900 used to protect a load 902. As shown, a DC electromagnetic coil 904 is in parallel with load 902. Switch 906 connects power supply 908 to diode 910.

When switch 906 is manually activated, power is allowed to flow from power supply 908 to diode 910. When switch 906 is closed, diode 910 is in series between power supply 908 and latching coil 904. Diode 910 is also in series between power supply 908 and load 902 when switch 906 is closed. Diode 910 rectifies the power to both coil 904 and load 902. Electromagnetic coil 904 is coupled to switch 906 so that switch 906 is closed when coil 904 receives DC current from diode 901, i.e., when diode 910 is neither shorted nor open.

Returning to FIG. 2, circuit 200 also includes a microprocessor or microcontroller 216. One example of microcontroller 216 may be part no. PIC16C73SO manufactured by Microchip Corporation. One skilled in the art will recognize that an analog timer circuit or another equivalent circuit also could be used to achieve the same results as microcontroller 216.

When a user depresses heat activation lever 104 in FIG. 1, two-pole switch 236a and 236b is closed. This provides DC current to latching electromagnetic coil 222 through diode 204, which passed through an additional diode 230 before energizing the power supply 232 to start microcontroller 216. Microcontroller 216 biases transistors 218 and 220, such that current is allowed to flow in electromagnetic coil 222 and hold two-pole switch 236a and 236b closed. Although depicted as transistors, one with ordinary skill in the art will recognize that any switch with an element to bias may be used.

Electromagnetic coil 222 is wound with copper wire. Other materials, such as aluminum, acting as a thermistor may be used for coil 222. As toaster 100 heats, the resistance of this copper wire increases. This causes a voltage 224 on coil 222 to increase. Microcontroller 216 may read analog voltage 224 at coil 222 and use it to calculate a compensation factor to reduce the toasting time for a warm toaster, e.g., for a subsequent toasting cycle. Because toast cooks faster in a hot toaster versus a cool toaster, the compensation factor results in a consistent toast color for each heating cycle. U.S. Pat. No. 6,198,077 discloses one method of using a compensation factor to account for a warm toaster, and is incorporated herein by reference. As shown in FIG. 3, microcontroller 216 may read voltage 224 at coil 222 via a resistor divider formed using resistors 340 and 342.

Microcontroller 216 also reads darkness control knob potentiometer 226 and calculates a toasting time based on the toast color setting of potentiometer 226 and the calculated compensation based on coil voltage 224. Microcontroller 216 determines the total toasting time, then determines the time to switch from high-powered heating elements to 50% power via relay 206, 208 and diode 204. For example, the toasting time at high power may be ⅔ of the total toasting time. One skilled in the art will recognize that any factor can be programmed with microcontroller 216 using a user-settable variable, such as the previously discussed speed control knob (not shown). In another embodiment, toaster 100 could have additional toasting options with specific percentages of time during which toaster 100 is in the high-powered versus the low-powered mode. For example, toaster 100 could have a "Pastry" option (not shown) with a ratio of 20% in the high-powered mode and 80% in the low-powered mode to toast thicker, heavier breads and pastries since these foods typically require longer toasting times at lower wattage.

Several safety features may be added to circuits 200 and 300 to prevent problems due to component failure. For example, redundant transistors 218 and 220 are connected to output 234 of microcontroller 216 to operate electromagnetic coil 222. When toaster 100 is activated, output 234 of microcontroller 216 is changed to a low impedance state and asserted low. This turns off transistors 218 and 220, allowing current to flow in coil 222, which holds two-pole switch 236a and 236b closed. If output 234 from microcontroller 216 is asserted high, then transistors 218 and 220 will turn on, shorting coil 222. This de-energizes electromagnetic coil 222 and shuts off the power to toaster 100. If either transistor 218 or 220 fails shorted, the unit 100 fails safe. If one of the transistors 218 or 220 fails open, the other transistor 220 or 218 continues to operate coil 222. Having two redundant transistors 218 and 220 reduces the chance of one failure causing the coil to stay powered, which would result in excessive heating.

In addition, redundant transistors 212 and 214 are arranged in a redundant series fashion to increase the reliability of operating relay 206, 208. As with redundant transistors 218 and 220, if one transistor 212 or 214 fails, the other transistor 214 or 212 continues to operate relay 206, 208.

As shown in FIG. 3, additional inputs to microcontroller 216 may include fast toast button switch 344 and a corresponding fast toast indicator 346, which indicates when fast toast button 108 has been activated. Also, a crumb tray button switch 348, a corresponding crumb tray indicator 352 and a crumb tray sensor memory 350 may be included. Crumb tray indicator 352 may be green 352 when crumb tray 116 does not need to be cleaned and may turn red 354 when crumb tray 116 needs to be cleaned, as discussed in more detail below with reference to FIGS. 5–7. Six of the ten LEDs 356 of progression indicator 110 also are shown connected to various outputs of microcontroller 216. One skilled in the art will understand how to connect the specific inputs and outputs to microcontroller 216.

Although the toasting cycle was discussed in terms of two different power levels for two different time periods of the toasting cycle, one of ordinary skill in the art will recognize that more than two different power levels may be used during a given toasting cycle. For example the power levels may change continuously (e.g., continuously increasing or continuously decreasing) during the toasting cycle.

The following C language code illustrates the operation of microcontroller 216 employed in accordance with one embodiment of the present invention:

```
include <16F73.H> fuses RC, WDT, NOPUT
use delay(clock=4000000, RESTART_WDT) // 4 mhz clock include <2402-877.c>  // file for EEPROM drivers
////////////////////////////////////////////////////////////
//////////    Defined variables    /////////////////////////
////////////////////////////////////////////////////////////

#BYTE portA = 0x05
#BYTE portB = 0x06
#byte portC = 0x07
#BYTE STATUS = 0x03
#DEFINE Carry 0
#BYTE FSR =  0x04
#BYTE PCL =  0x02
#BYTE TMR0 = 0x01
#BYTE TMR1L = 0x0E
#byte TMR1H = 0x0F
#byte T1CON = 0x10
#byte intcon = 0x8B
#byte PIR1   = 0x0C
#BYTE adcon0 = 0x1F
```

```
#BYTE adcon1 = 0x9F
#BYTE adres = 0x1E
BYTE pcon = 0x8E byte CMCON = 0x1F
byte VRCON = 0x9F
#byte PIE1 = 0x8C
#byte CCP1CON = 0x17

////////////////////////////////////////////////////////
//////////////// I/O MAP //////////////////////////////
//\\\\\\\\\\\\\\\\\\\\\\\\\\\\\\\\\\\\\//////////////

#DEFINE MAXCOUNT 10        // defines how many operations before
                           // dirty crumb tray light goes on // I/O List:

///////////////////// PORTA ///////////////////////

#DEFINE POT 0              // Potentiometer analog input
#DEFINE COIL 1             // Coil Analog Input
#DEFINE FASTLIGHT 2        // on during FAST toast mode
// RA3/AN3 not used        // spare analog input
// RA4 not used
// RA5 not used

#DEFINE ATRIS 0B11111011   // Defines pins on port as input (1) or output (0)

///////////////////// PORTB ///////////////////////

#DEFINE RELAY 0            // output to High speed/ Low speed relay
#DEFINE COILOUT 1          // Output to latching electromagnet coil
#DEFINE CRUMBGREEN 2       // green light for dirty crumb tray
#DEFINE SLOWBUTTON 3       // slow/fast button, int on change
#define CRUMBBUTTON 4      // Clear crum tray button int on change
#DEFINE CRUMBRED 5         // red light for dirty crumb tray
// RB6  ISSP port
// RB7  ISSP port

#DEFINE BTRIS 0B11011000

#DEFINE OFFMODE 0B1011010

#DEFINE FASTMODE 0B11011101

#DEFINE SLOWMODE 0B11011100
```

```
//////////////////////// PORTC ////////////////////////

// RC0 1 2 = LEDs 1 - 3 define SCL 3           // RA3 = SCL for external EEPROM unit 24LC00
define SDA 4           // RA4 = SDL //RC5 RC6 RC7 = LED's 4, 5, 6

DEFINE CTRIS 0

////////////////////////////////////////////////////////////////////////////
//*****************// VARIABLES //*****************//
//////////////////////////////////////////////////////////////////////////// int16 Timer1counter;    // counts down seconds in Toast mode int8 flags;             // single bit flags
define slowflag 0      // slow flag button push request
#define crumbflag 1     // crumb clear button push request
define alternate 2     //alternates the last LED bar light define MAX 5000        // Sanity Check int8 mirrora;
int8 mirrorb;           //
int8 mirrorc;

int16 secscounter;      // calculates seconds int16 time1;            // Toast mode timer
int16 time2;
int8 crumbcount;        // counts how many time toaster has been used
int16 Time30;           // used in 30 sec delay
int16 Safetycheck;      // used to check for bad inputs
int16 LEDbarIncrement;  // Used to determine time increment for LED bar progress
int16 PotReading;       // reading of potentiometer
int16 coilReading;      // voltage on coil
int16 ToastTime;        // total time for cooking
int16 fasttime;         // time for high watt cooking
int8 tempcounter;
int16 LEDcounter;

int8 tempflash;
int8 maskflash;
int8 flashmir;
int ADRESULT;

int8 test;
```

```
////////////////////////////////////////////////////////////////
//*************// DELAY ROUTINE //*****************//
////////////////////////////////////////////////////////////////
        void delay100(){
        // 100 mS delay at 4 mhz int counter0;
        int counter1;
                counter1 = 129;
                counter0 = 0;
                        #asm
                                loop1:
                                        decfsz counter0, f
                                        goto loop1
                                        clrwdt
                                        decfsz counter1, f
                                        goto loop1
20              #endasm

}

////////////////////////////////////////////////////////////////
        //***************  A/D ROUTINE  ******************//
        ////////////////////////////////////////////////////////////////

// Set the proper channel before implementing this fuction
        int Test_ADC_port(){
        int ADC_temp;

ADC_temp = 200;
                // channel should have already been set...

if(!bit_test(ADCON0, 0)){       // if the module is not turned on
                        bit_set(ADCON0, 0);     // turn it on
                        delay100();             // wait 9 tads
                }

Bit_set(ADCON0, 2);             // start conversion delay100();                     // wait 9 tads
                if(!bit_test(ADCON0, 2)){
                        ADResult = adres;       //was A/D operation OK?
                }ELSE{
```

```
                    ADResult = 0;           // Timed Out - fails safe becuase generates
        // shortest toast time
                }
        }
        //////////////////////////////////////////////////////////////////////
        //****************  INTERRUPTS    *****************//
        //////////////////////////////////////////////////////////////////////
        #INT_TIMER1
        void Tmr1Int(){
        int mirrorBtemp;

secscounter++;
                LEDcounter++;

tempcounter++;

                if(!bit_test(flags, slowflag)){    // Blink lightbar is fastmode every 1 second
                        if(tempcounter >= 30){
                                tempcounter = 0;

                                        if(bit_test(flags, alternate)){
                                                bit_set(mirrorA, FASTLIGHT);
                                                bit_clear(flags, alternate);
                                                flashmir = maskflash;
                                        }ELSE{
                                                bit_clear(mirrorA, FASTLIGHT);
                                                bit_set(flags, alternate);

                                               flashmir = maskflash >> 1;

}
                                }

                       }

If(LEDcounter >= LEDbarIncrement ){    // LED light bar timer
                        LEDcounter = 0;
                        maskflash <<= 1;
                        maskflash |= 0x01;
                        flashmir = maskflash;
```

```
        } mirrorC = flashmir << 2;          // working around the //fact the two
                                          // portC pins are used up
                                          // with I2C mirrorC &= 0B11100000;

mirrorC |= flashmir & 0B0000111;

portC = mirrorC;
        mirrorB = portB;

mirrorBtemp = ~mirrorB;           // test for button press if(bit_test(mirrorBtemp, slowbutton)){ bit_clear(flags, slowflag);
        } if(bit_test(mirrorBtemp, CRUMBBUTTON)){ bit_clear(flags, crumbflag);

write_ext_eeprom(0x01,0);  // clear memory on crumb button
                                           // press

} if (bit_test(flags, slowflag)){ bit_clear(mirrorA, fastlight);

}ELSE{ bit_set(mirrorA, fastlight);
        } if(bit_test(flags, crumbflag)){
                bit_set(mirrorB, CRUMBRED);
                bit_clear(mirrorB, CRUMBGREEN);
        }ELSE{
                bit_clear(mirrorB, CRUMBRED);
                delay100();
```

```
                    bit_set(mirrorB, CRUMBGREEN);
        }

TMR1H = 0xBC;
        TMR1L = 0xCA;            // hand calibrated to work out to 30 ints per second }
////////////////////////////////////////////////////////////////////////
//***************** SUBROUTINES *********************//
////////////////////////////////////////////////////////////////////////

//////////////////////////
/////////// Setup_Processor()
////////////////////////// void Setup_Processor(){

PortB = FASTMODE;        /// This means relay is energized
        MirrorB = FASTMODE;
        set_tris_B(BTRIS);

mirrorc = 0x01;
        portC = mirrorC;
        set_tris_C(CTRIS);

PortA = 0;
        mirrorA = 0;

set_tris_A(ATRIS);

setup_WDT(WDT_576MS);

restart_wdt();

adcon0 = 0B10000001;     // channel 0, 32 tads,
        adcon1 = 0B11111100;

Setup_timer_1(T1_INTERNAL |T1_DIV_BY_1);

init_ext_eeprom();       // initialize 24C00 module

Flags = 0x01;            // slowflag = 1 crumbcount = read_ext_eeprom(0x01);
```

```
         crumbcount++;
         write_ext_eeprom(0x01, crumbcount);
    //   if(crumbcount > MAXCOUNT){ bit_set(flags, crumbflag);

    //   } flashmir = 0x01;       // mirror byte used in light bar maskflash = 0x01;      // another mirror byte used in masking off flashmir bits
         secscounter = 0;       // counter for interrupt driven timer LEDbarincrement = 0xFFFF;   // set so the light bar does not go off prematurely

20  }

//////////////////////////
    ////////// Flashy()
    //////////////////////////
25
    void Flashy(){
    int preflash;              // mirror byte
    int mirrorBtemp;
         tempflash = 48;       // counter preflash = 0;

         do{ restart_wdt();

mirrorBtemp = ~portB;
             if(bit_test(mirrorBtemp, slowbutton)){ bit_clear(flags, slowflag);
             }
             if(bit_test(mirrorBtemp, CRUMBBUTTON)){ bit_clear(flags, crumbflag);
```

```
                write_ext_eeprom(0x01,0);
        } if(bit_test(flags, slowflag)){
                bit_clear(mirrorA, fastlight);
        }ELSE{
                bit_set(mirrorA, fastlight);
        } if(bit_test(flags, crumbflag)){
                bit_set(mirrorB, CRUMBRED);
                bit_clear(mirrorB, CRUMBGREEN);
        }ELSE{
                bit_clear(mirrorB, CRUMBRED);
                delay100();
                bit_set(mirrorB, CRUMBGREEN);
        } delay100();

preflash <<= 1;            // illuminate 1 more LED to the left if(!bit_test(preflash, 6)){   // if no overflow
                preflash |= 0x01;     // re-illuminate LED#1
        }                             // else de-illuminate lower LEDs if(preflash == 0B11000000){   // roll over after 6 bits
                preflash = 0;
        } maskflash = preflash & 0B00111000;   // parse the mirror byte into a
                                             //pattern matching
                                             // actual LEDS
        maskflash <<= 2;

mirrorC = preflash & 0B0000111;

mirrorC |= maskflash;
```

```
            portC = mirrorC;
            portA = mirrorA;
            portB = mirrorB;
        }while (--tempflash < 48);

restart_wdt();

        delay100();

mirrorC = 0X01;

portC = mirrorC;
        flashmir = 0x01;
        maskflash = 0x01;

tempcounter = 0;
        LEDcounter = 0;

intcon = 0B11000000;        // Enable interrupts global
        pie1 = 0b00001001;          // Enable timer1 interrupt
    }

////////////////////////////
    /////////// Read_Coil()
    //////////////////////////// void Read_Coil(){ set_ADC_channel(coil);      // set up to read coil voltage
        delay100();                 // wait a tad Test_ADC_port();
        coilReading = ADResult;

        // Next read will be for potentiometer, so set this up now
        set_ADC_channel(POT);
        delay100();

}
45
    ////////////////////////////
    /////////// Read_Pot()
    ////////////////////////////
```

```
void Read_Pot(){

//returns 8 bit number for potentiometer reading
    // Channel already set to POT analog input
            Test_ADC_port();
            Potreading = ADResult;

Potreading = Potreading + 72;        // Based on actual experiment with boards coilreading = 150 - coilreading;     // heuristic formula coilreading = coilreading / 4;       // ditto Toasttime = Potreading * coilreading;    // total toast time if (bit_test(flags, slowflag)){          // this will be recalculated constantly in case
                                             //people dwiddle
                                             // the knob or press the fast button toasttime = toasttime * 2;   // double toast time in slow mode,
                                                 // high heat for 20%
                    fasttime = toasttime / 5;

}ELSE{
                    fasttime = (toasttime * 4) / 6;  // 2/3 high heat ( 2/3 had truncation
                                                     // problems for some reason so used 4/6)

}
            LEDbarIncrement = Toasttime / 5;     // Increment for illuminating LED light bar
}
////////////////////////////////////////////////////////////////
//                                                            //
//******************* MAIN ********************//
//                                                            //
////////////////////////////////////////////////////////////////
#SEPARATE
main() { portB = FASTMODE;        // relay  energized
        set_tris_B(BTRIS);
```

```
if(bit_test(pcon, 1)){          // if it was anything but a power-on-//reset,
        do{
                portB = OFFMODE;   // shut off and loop until watchdog timeout
        }while(TRUE);
}
bit_set(PCON, 1);               // remember PORS bit in case of WDT setup_processor();

flashy();

read_coil();

/// Timing cycle and main superloop:

Do{
        restart_wdt();

delay100();             // wait 9 tads
        Read_Pot();             // also calculates toast time if(secscounter >= fasttime){
            bit_clear(mirrorB, relay);
        } if(secscounter >= MAX){     // sanity check
            portB = OFFMODE;
        } portA = mirrorA;
        portB = mirrorB;

}while(secscounter <= Toasttime);

// A quick flash before we go:

disable_interrupts(global);

flashmir = 5;

do{
        restart_wdt();
        PortC = 0xFF;
        delay100();
        restart_wdt();
        portC = 0;
        delay100();
```

```
        }while(--flashmir < 6);

     // Now shut everything off
     Do{
             restart_wdt();
             disable_interrupts(global);
             portC = 0;
             portA = 0;
             portB = OFFMODE;
             }While (TRUE);
20
     } //
```

Figure 4:
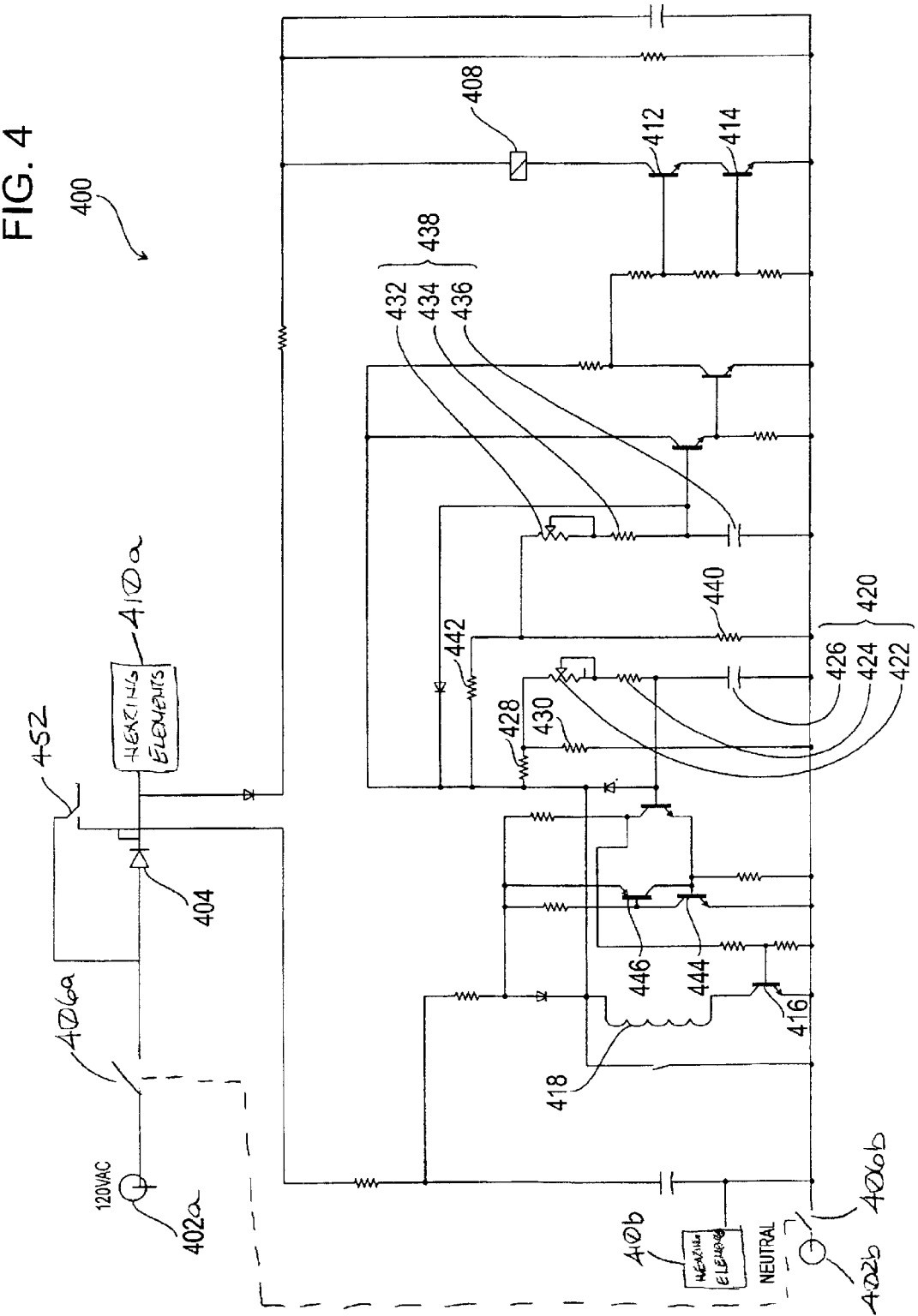
FIG. 4 depicts a third embodiment of a circuit used in the high-speed toaster depicted in FIG. 1.

FIG. 4 depicts an analog version of the high-speed toaster control circuit 400. Similar to digital circuits 200 and 300 of FIGS. 2 and 3, respectively, when the user depresses heat activation lever 104, two-pole switch 406a and 406b closes, thus allowing current to flow from the power supply 402a and 402b to circuit 400. This also energizes the electronic control and heating elements 410a and 410b. Transistor 416 is biased to allow current to flow in electromagnetic coil 418, causing lever 104 to be held down by keeping two-pole switch 406a and 406b closed. Transistors 412 and 414 are biased to cause relay 452, 408 to close its normally open contacts. This shorts around diode 404, thus providing full voltage (e.g., 1500 watts) to heating elements 410a and 410b.

Potentiometer 422, resistor 424, and capacitor 426 form RC timer 420. Resistors 428 and 430, which form a resistor divider that is powered by the voltage on coil 418, feed RC timer 420. Potentiometer 432, resistor 434, and capacitor 436 form another RC timer 438. Resistors 440 and 442, which form a resistor divider that is powered by the voltage on coil 418, feed RC timer 438.

Similar to circuits 200 and 300 of FIGS. 2 and 3, respectively, coil 418 is wound with copper wire, or some other metal that displays the characteristics of a thermistor, such as aluminum. Thus, as the temperature of the toaster increases, the resistance of this copper wire increases, which causes the voltage on coil 418 to increase, creating a feedback to RC timers 420 and 438. This produces a compensation effect, reducing the toasting time on subsequent toasting cycles.

RC timer 438 is driven by a voltage approximately 40% higher than RC timer 420. This, combined with the difference in values of resistors 424 and 434 in RC timers 420 and 438, respectively, causes RC timer 438 to time out approximately 33% faster than RC timer 420. Potentiometers 422 and 432 are mechanically linked, so that they turn as a unit to insure that the ratio of times will remain the same regardless of the toast color setting selected by the user.

RC timer 438 drives relay 452, 408 and RC timer 420 drives electromagnetic coil 418. Thus, relay 452, 408 switches 33% faster than coil 418. When relay 452, 408 switches, diode 404 rectifies the current into heating element 410a and 410b, causing it to operate at 50% wattage.

Transistors 444 and 446 are arranged in an "SCR equivalent" circuit which mimics the latching action of a conventional SCR. One of ordinary skill in the art will recognize that an SCR or a single transistor may also be used. When RC timer 420 turns on transistors 444 and 446, they latch, causing voltage to drop across electromagnetic coil 418. When this voltage drops sufficiently, coil 418 releases toaster carriage 104, opening two-pole switch 406a and 406b and shutting off power to the unit.

Several safety features, similar to those of FIGS. 2 and 3, are added to circuit 400 of FIG. 4. These safety features, although not required, prevent problems due to component failure. For example, redundant transistors 412 and 414 operate relay 452, 408. If either of these transistors 412 or 414 were to fail shorted from Collector to Emitter, then the other transistor 414 or 412 would still shut off relay 452, 408. Having two transistors 412 and 414 reduces the chance of one failure causing relay 452, 408 to stay powered, which would result in excessive heating. If transistors 412 and 414 fail open, then the unit fails safe. Transistor 416 is turned on when the toaster is energized, allowing current to flow in coil 418 and is de-energized when SCR equivalent transistors 444 and 446 are turned on. This ensures that electromagnetic coil 418 is de-energized at the proper time, regardless of a failure in either transistor 444 or 446.

Figure 5:
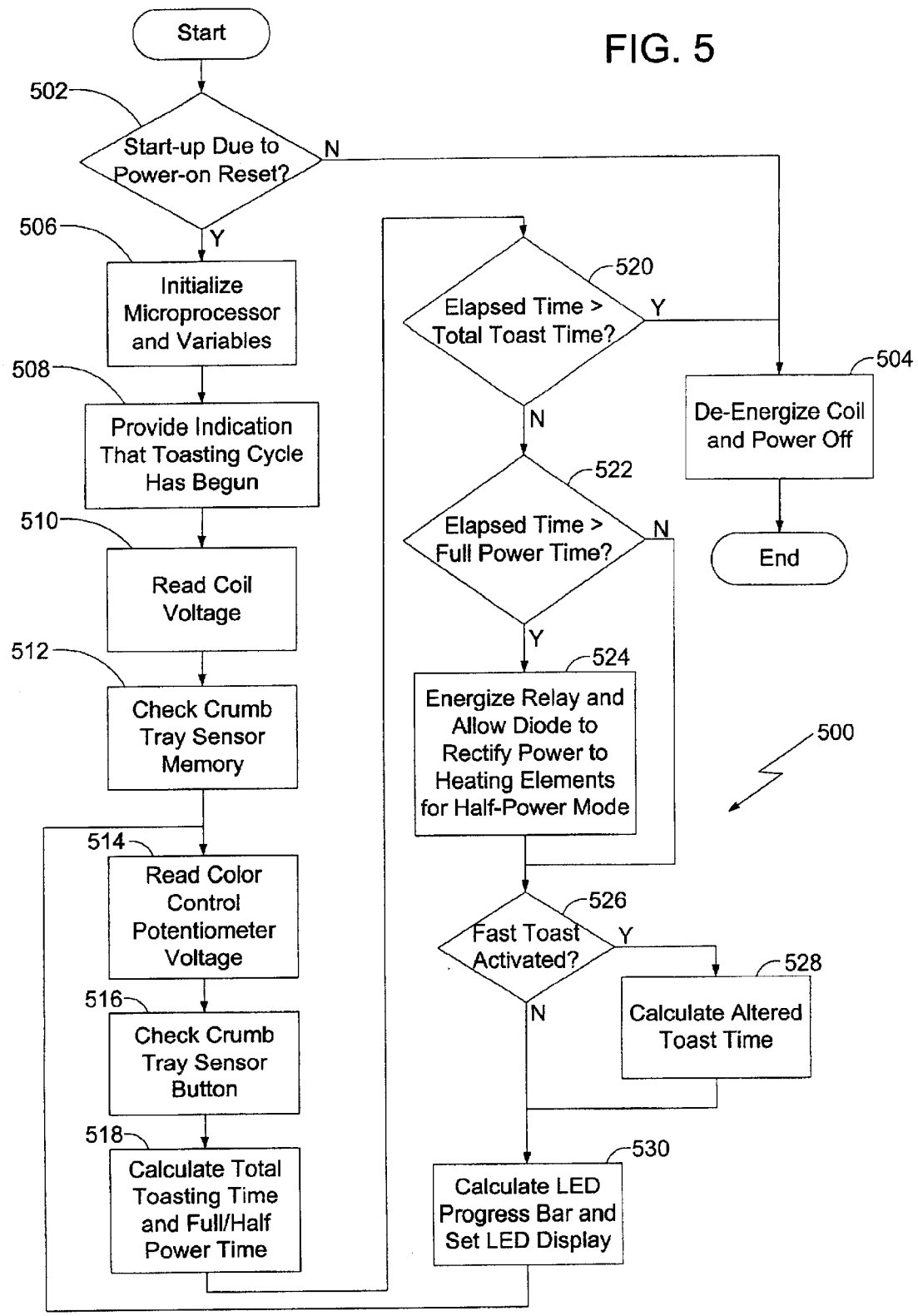
FIG. 5 depicts a flow diagram of the steps performed by the high-speed toaster depicted in FIG. 1.

FIG. 5 depicts a flow diagram 500 of the steps performed by toaster 100 having microcontroller 216 to toast a piece of bread in accordance with the present invention. Initially, when toaster 100 is activated, the unit determines whether the startup was due to a power-on reset (step 502). If the startup was not due to a power-on reset (e.g., if the startup was due to a voltage fluctuation, brownout, a watchdog reset or other problem), the unit de-energizes latching electromagnetic coil 222 and powers off (step 504). Otherwise, if the startup was due to a power-on reset, toaster 100 initializes microcontroller 216 and various variables (step 506). For example, in the example computer code above, toaster 100 sets the direction of I/O ports and the initial state, sets a watchdog timer, sets the analog input ports, and sets the timer interrupt for 30 interrupts per second. Toaster 100 also initializes the EEPROM module 350, which is external to microcontroller 216 and used to count the number of toaster cycles for the crumb tray sensor, and initializes the FLAGS variable. One of ordinary skill in the art will recognize that any rewritable non-volatile memory can also be used. Additional variables are initialized. For example, "Flashmir," which is used in illuminating the LEDs in a proper sequence, "Maskflash," which is used in illuminating the LEDs in a proper sequence, "Secscounter," which is incremented thirty times per second by a timer interrupt, and "LEDbarincrement," which is used in illuminating LEDs in proper sequence.

Next, toaster 100 provides an indication that the toasting cycle has begun (step 508). For example, the toaster may display an LED wakeup pattern, such as creating a flashing startup sequence on the series of LEDs of progression indicator 110. Toaster 100 can then read the coil voltage (step 510). In particular, microcontroller 216 reads the voltage on electromagnetic coil 222 and stores this information. In the example source code, the voltage may vary from 7 to 9 volts, and is converted to a value between approximately 90 to 119 before it is stored in a variable, e.g., "COILREADING." The coil voltage corresponds to the temperature inside the toaster, as discussed above, and is used to compensate for a warm toaster in calculating toast time.

The next step performed by toaster 100 is to check crumb tray sensor memory 350 (step 512). Toaster 100 also reads the voltage from color control potentiometer 226 (step 514). In the example source code, the color control potentiometer voltage may range from 0.3 to 3.7 volts, and the corresponding reading, which is stored in variable "POTREADING," has a corresponding range of approximately 17 to 189. Toaster 100 then checks crumb tray sensor button 112 to determine whether crumb tray 116 has been cleaned (step 516).

Using the values for coil voltage and color control potentiometer, toaster 100 calculates both the total toasting time and the full/half power time (step 518). Next, unit 100 determines whether the elapsed time has exceeded the previously calculated total toast time (step 520). If so, the unit de-energizes the coil and shuts off power to the heating elements (step 504). Otherwise, if the elapsed time is not greater than the total toast time, the toaster determines whether the elapsed time has exceeded the previously calculated full power time (step 522). If the elapsed time is not greater than the full power time, the toaster determines whether fast toast button 108 was activated (step 526). If so, toaster 100 calculates an altered toasting time (step 528). Toaster 100 also calculates the LED progress bar and sets the corresponding LED display in progression indicator 110 (step 530). Toaster 100 then returns to step 514 to read the color control potentiometer voltage to determine if any of the settings have changed. If, at step 522, toaster 100 determines that the elapsed time is greater than the full power time, toaster 100 energizes relay 206, 208, allowing the diode 204 to rectify the power to heating elements 210 for half-power mode (step 524). Toaster 100 then continues at step 526 by determining whether fast toast button 108 was activated.

Figure 6:
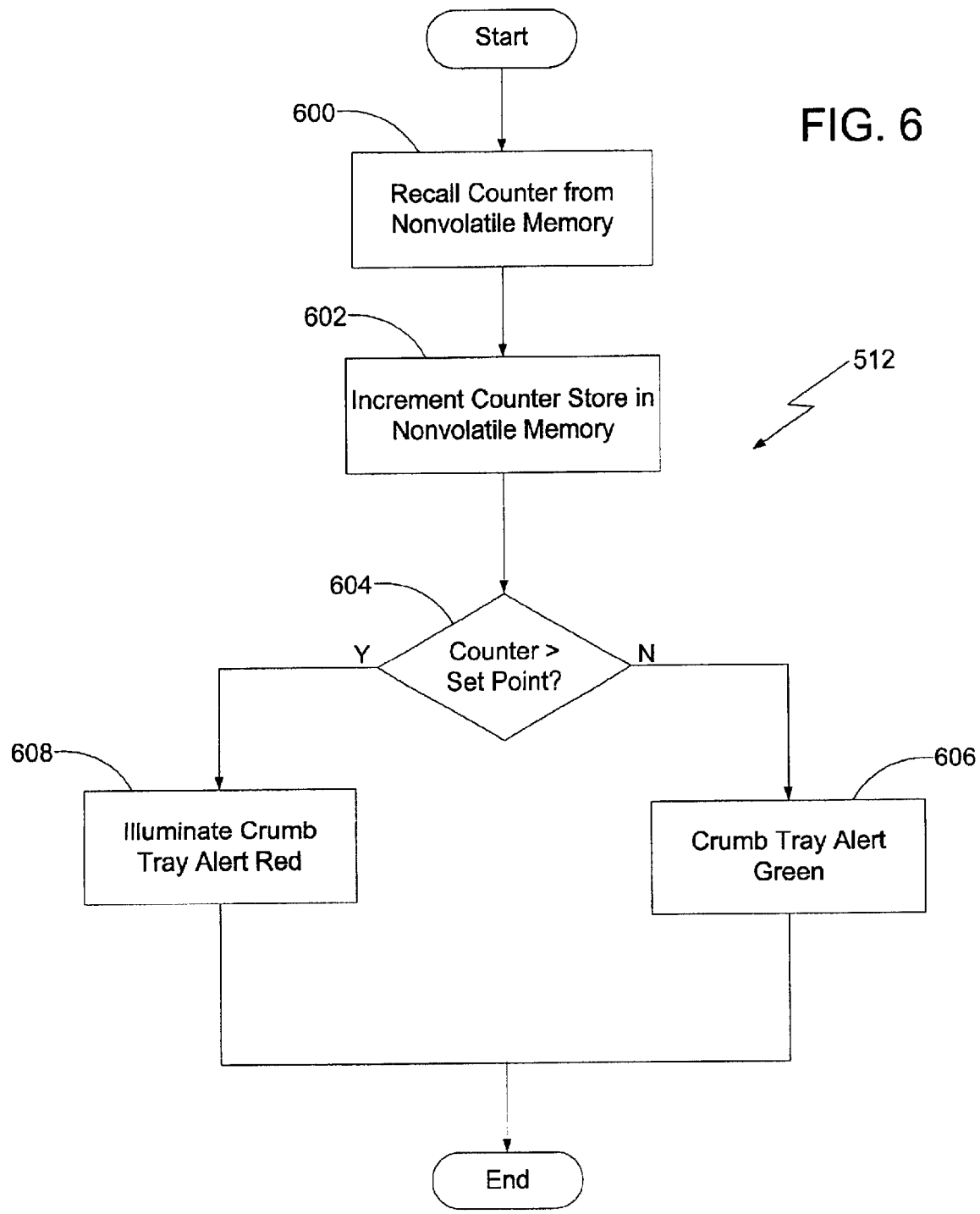
FIG. 6 depicts a flow diagram illustrating the check crumb tray sensor memory step of FIG. 5.

FIG. 6 depicts the steps performed by toaster 100 when it checks the crumb tray sensor memory 350 in step 512. Microcontroller 216 initially reads a number (e.g., "CRUMBCOUNT"), from the nonvolatile memory, shown in FIG. 3 as external EEPROM memory unit 350 (step 600). This is a nonvolatile memory which stores a count corresponding to the number of times the toaster has been operated since the "Clear" button was activated, as discussed above. Nonvolatile memories retain data even when power is off. The next step performed by microcontroller 216 is to increment CRUMBCOUNT (step 602). Microcontroller 216 then determines whether CRUMBCOUNT is greater than an internal set point (step 604). The set point may be any number, e.g., 20. The manufacturer and/or user also may designate the set point. If CRUMBCOUNT is not greater than the set point, crumb tray 116 does not need to be cleaned, and the crumb tray alert light is illuminated green (step 606). Otherwise, if CRUMBCOUNT is greater than the set point, crumb tray 116 needs to be cleaned, and the crumb tray alert light is illuminated red (step 608). Toaster 100 also may become disabled if the CRUMBCOUNT exceeds the set point. The user may clear the red crumb tray alert by manually pressing crumb tray button 112. Other embodiments may automatically clear the crumb tray indicator 114 when crumb tray 116 is removed by a simple mechanical linkage to a push button, which is activated when crumb tray 116 is removed.

Figure 7:
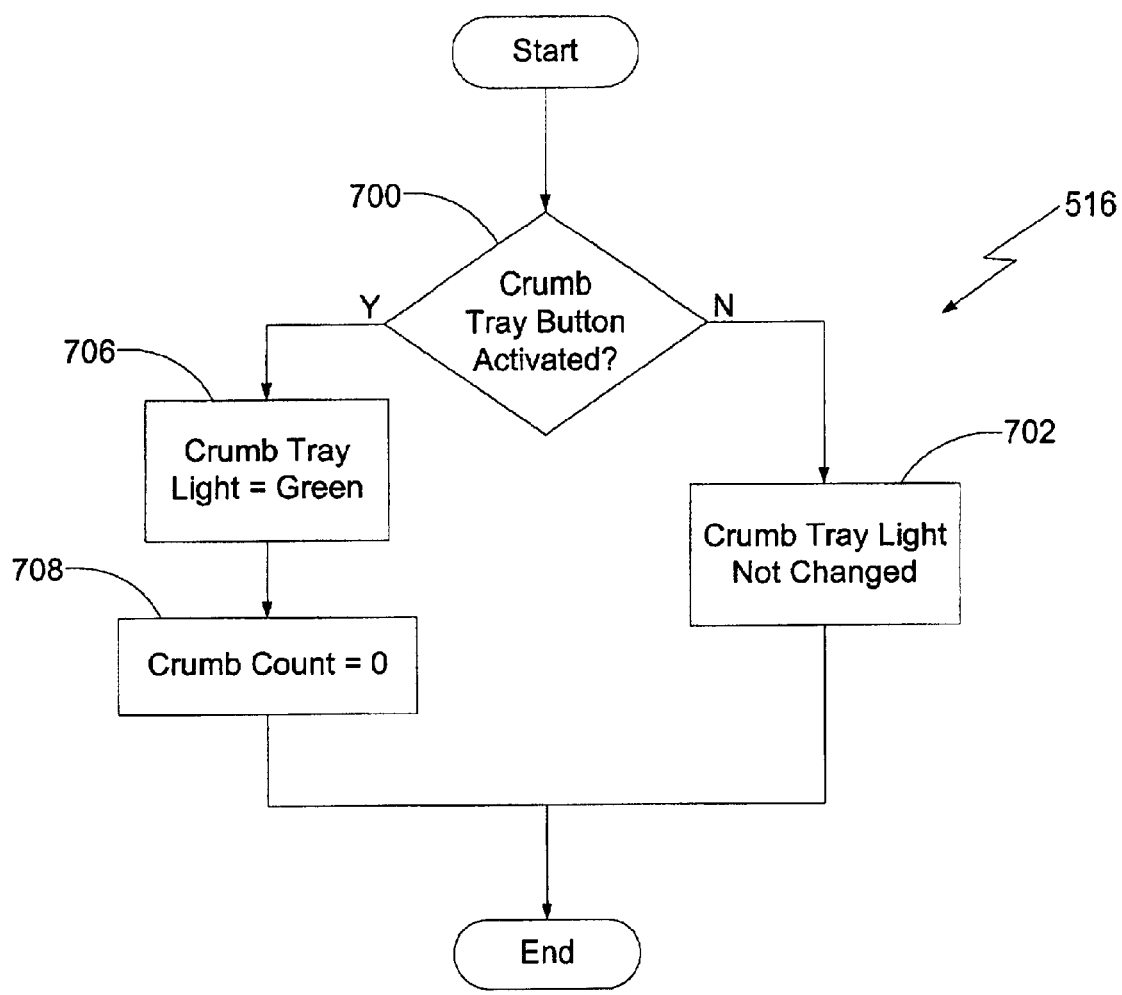
FIG. 7 depicts a flow diagram illustrating the check crumb tray sensor button step of FIG. 5.

FIG. 7 depicts the steps performed by toaster 100 when it checks the crumb tray sensor button in step 516. Initially, the toaster determines whether crumb tray button 112 was reset (step 700). If crumb tray button 112 was not reset, the crumb tray light is not changed (step 702). Otherwise, if crumb tray button 112 was reset, the crumb tray light is illuminated green (step 706). Also, CRUMBCOUNT (i.e., the EEPROM unit's nonvolatile memory) is reset to zero (step 708). Subsequent uses of the toaster will increment this number until it again exceeds the set point.

Figure 8:
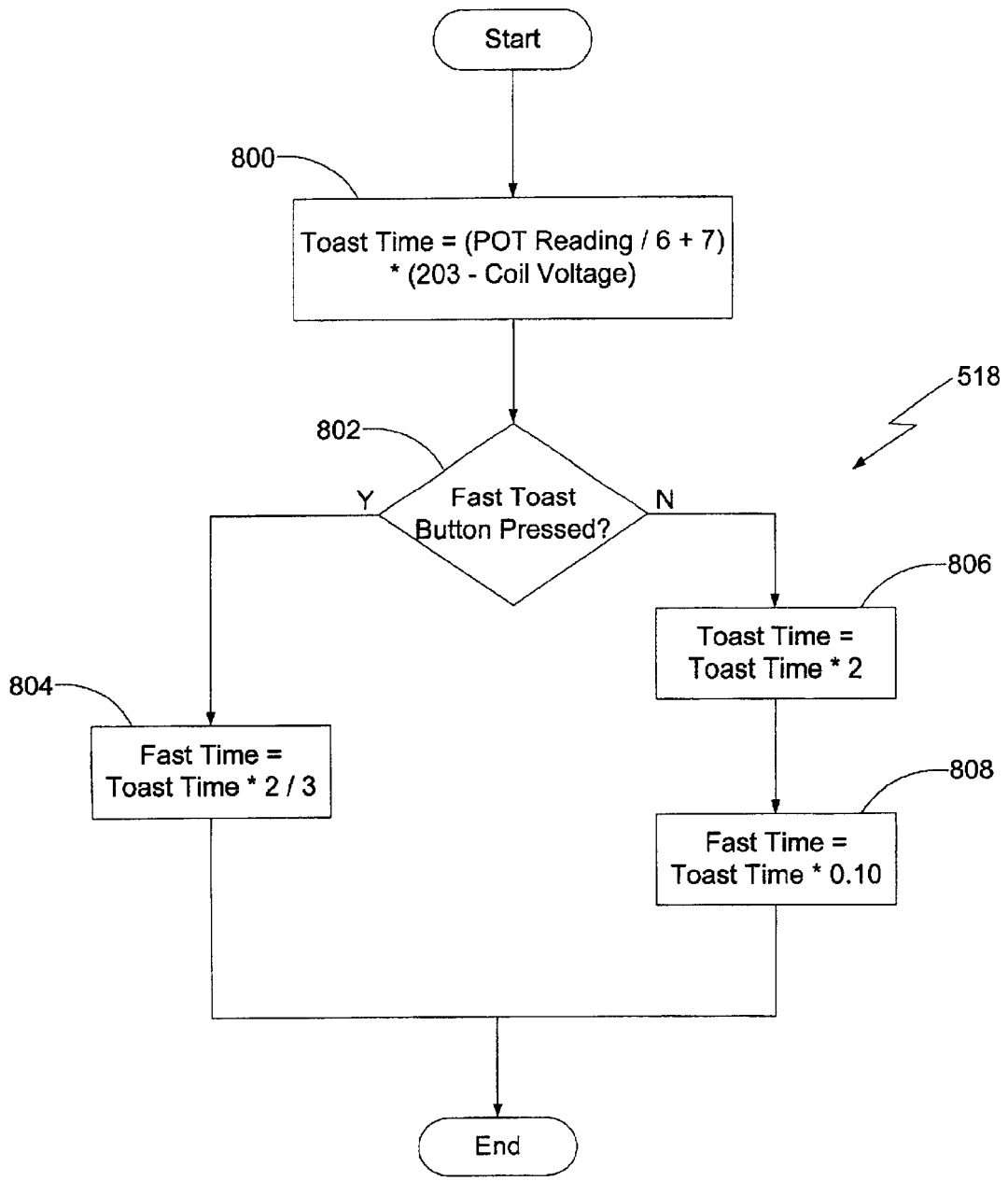
FIG. 8 depicts a flow diagram illustrating the calculate total toasting time and full/half power time step of FIG. 5.

FIG. 8 depicts the steps performed by toaster 100 when it calculates the total toasting time and the full/half power time in step 518. The total toasting time is determined from both the color control potentiometer reading and the coil voltage. In particular, the toasting time is directly related to the potentiometer reading, and inversely related to the electromagnetic coil voltage. Although various formulae might be used, in this example, the toast time=(POTREADING/6+7)*(203−COILVOLTAGE) (step 800). Thus, in this example, toasting times may vary from 44 seconds (light toast) to 131 seconds (dark toast) for a toaster starting cold in fast mode. The toaster then determines whether fast toast button 108 was activated (step 802). If fast toast button 108 was activated, the time during which toaster 100 is in the high-powered mode is calculated. For example, the fast toast time, "FASTTIME," could be set to ⅔ the total toast time. Thus, FASTTIME=⅔*TOASTIME (step 804). In the example code, TOASTTIME may vary between 1200 and 3900, which indicates the number of ⅟30th second interrupts that will be counted before the toaster turns off.

Otherwise, if fast toast button 108 were not activated, a "regular" toast mode can be implemented. In the example shown, the toast time is doubled (step 806). Then, the full power/half power switch is set to 10% of the total time (step 808). This approximates the toast time that would be found in a standard toaster. Since half power is 750 watts, and a standard toaster is 850 watts, the 10% time at full power (1500 watts) compensates with approximately equal watt-seconds to a standard toaster. The user may choose a regular toast mode by not activating fast toast button 108. "Regular" toast times will vary between 88 and 262 seconds. As discussed above, if fast toast button 108 is not activated, toaster 100 may alternatively function as a conventional toaster, heating the bread using a single, low power.

Due to the increased heat of toaster 100, these times will be reduced by about 40% in a fully heated toaster after the third or fourth toasting cycle.

To illustrate the efficiency of toaster 100, as discussed above, a conventional toaster operating at 850 watts toasts a slice of bread to a medium color in approximately 120 seconds. Thus, the conventional toaster requires 102,000 watt-seconds. Using 1500 watts (high-powered mode) for 54.4 seconds (81,600 watt-seconds), then switching to 750 watts (low-powered mode) for 27.2 seconds (20,400 watt-seconds), toaster 100 can obtain the same resulting toast color (81,600+20,400=102,000 watt-seconds) in a total time of 81.6 seconds, or 32% faster than the conventional toaster.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A toaster, comprising:

means for activating the toaster; and a counter coupled to the activating means wherein the counter is incremented upon each activation of the activating means, wherein the counter keeps track of the number of times the toaster is activated.

2. The toaster of claim 1, further comprising a memory to store a value of the counter.

3. The toaster of claim 1, further comprising an indicator coupled to the counter, wherein the indicator produces a signal when the counter reaches a set value.

4. The toaster of claim 3, wherein the signal comprises an audible signal.

5. The toaster of claim 3, wherein the signal comprises a visual signal.

6. The toaster of claim 3, wherein the set value is adjustable.

7. The toaster of claim 3, further comprising means for disabling the toaster when the counter reaches the set value.

8. The toaster of claim 1, further comprising an indicator coupled to the counter, wherein the indicator produces a signal when the counter is less than a set value.

9. The toaster of claim 8, wherein the signal comprises an audible signal.

10. The toaster of claim 8, wherein the signal comprises a visual signal.

11. The toaster of claim 8, wherein the set value is adjustable.

12. The toaster of claim 1, further comprising means for resetting the counter.

13. The toaster of claim 12, wherein the resetting means comprises a push-button.

14. The toaster of claim 12 further comprising a crumb tray coupled to the resetting means.

15. A toaster, comprising:

means for activating the toaster;

a counter coupled to the activating means wherein the counter is incremented upon each activation of the activating means, wherein the counter keeps track of the number of times the toaster is activated;

a memory to store a value of the counter; and an indicator coupled to the counter, wherein the indicator produces a signal when the counter reaches a set value.

16. The toaster of claim 15, wherein the signal comprises an audible signal.

17. The toaster of claim 15, wherein the signal comprises a visual signal.

18. The toaster of claim 15, further comprising a second indicator coupled to the counter, wherein the second indicator produces a second signal when the counter is less than the set value.

19. The toaster of claim 15, wherein the set value is adjustable.

20. The toaster of claim 15, further comprising means for disabling the toaster when the counter reaches the set value.

21. The toaster of claim 15, further comprising means for resetting the counter.

22. The toaster of claim 21, wherein the resetting means comprises a push-button.

23. The toaster of claim 21, further comprising a crumb tray coupled to the resetting means.

* * * * *